United States Patent Office 3,247,009
Patented Apr. 19, 1966

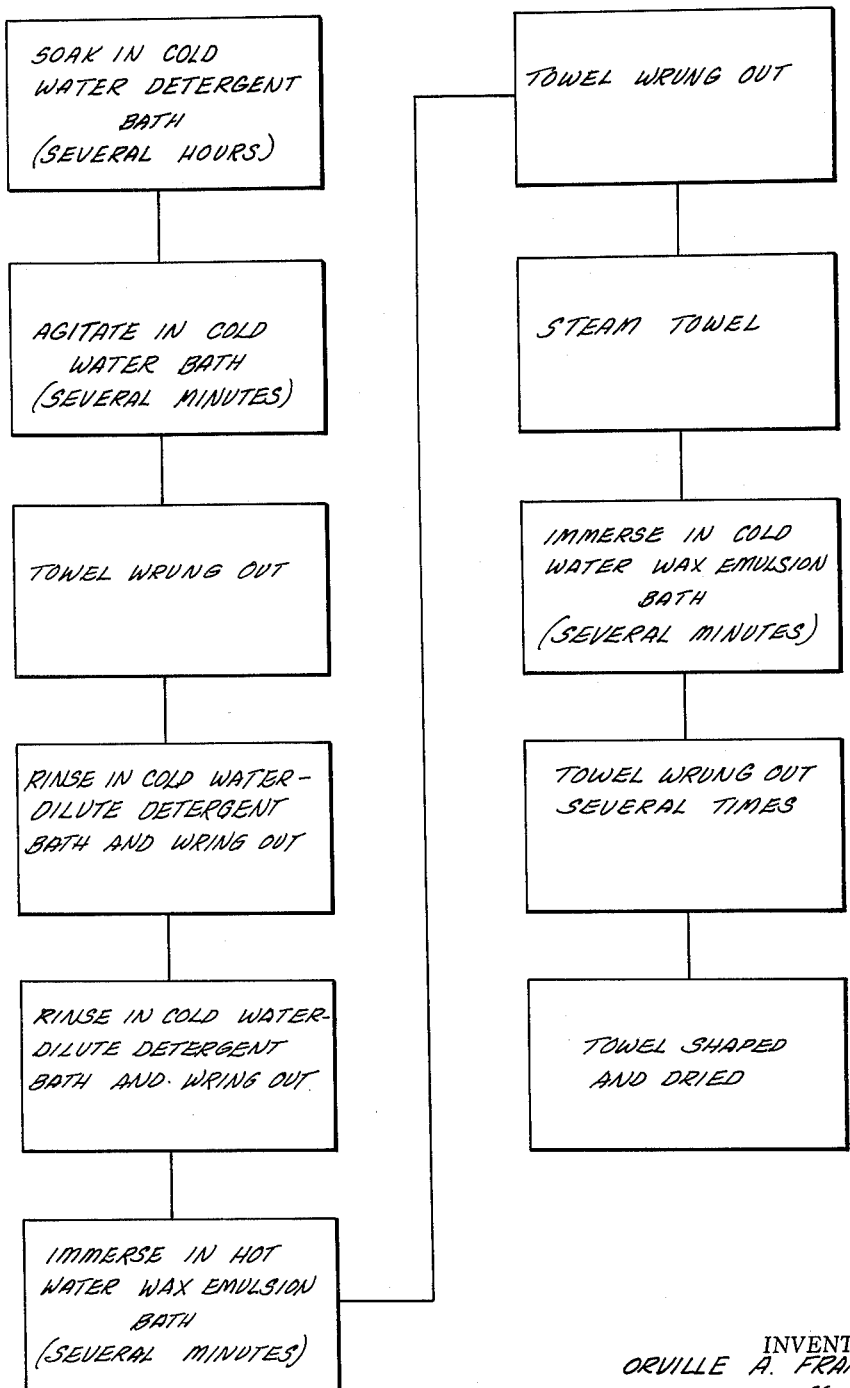

3,247,009
METHOD OF MAKING WIPING CLOTH
Orville A. Franey, 8560 Wolven, Rockford, Mich.
Filed June 27, 1963, Ser. No. 290,941
3 Claims. (Cl. 117—56)

This application is a continuation-in-part application of my copending application Serial No. 248,347, filed December 31, 1962, entitled Wiping Cloth, and issued March 31, 1964, as U.S. Patent No. 3,126,572.

This invention relates to a wiping and cleaning towel or cloth for polished surfaces, and more particularly to a method of treating a cotton base towel to provide a surface wiping towel.

Dealers of new and used automobiles have the constant problem of maintaining the vehicles clean. The conventional way of achieving this result is to employ a full-time employee to wash and chamois the vehicles day after day. The amount of time consumed and the cost of doing this is very substantial. However, this is looked upon as a necessary evil in the automobile business, since the vehicles must appear at their best, and since no other satisfactory method has been found to achieve this. The use of a conventional dust cloth results in streaks across the automobile. The use of a damp cloth also causes dried streaks and spots on the vehicle. Furthermore, the "smoke" or haze which develops on the windows of the vehicle cannot ordinarily be wiped clean without leaving streaks and spots, especially noticeable in the sunlight or in the lights of a display room.

The inventor herein has found that by a unique treatment of a loop containing towel, he has been successful in achieving a wiping towel which, when damp, is capable of actually removing dirt, dust and grime from the polished surface of a vehicle. The process developed was perfected after extensive experimentation and reasoning, coupled with a knowledge of fabric technology and unexpected bonuses.

It is therefore an object of this invention to set forth a unique method of treating a towel to effect an excellent wiping cloth for polished surfaces. The cloth can remove dirt, dust and grime with one or two sweeps, can be rinsed, and wiped over the vehicle body without leaving streaks, spots, or smears on either the metallic polished surfaces or the windows of the vehicle.

It is another object of this invention to provide a novel method of treating towels that removes the normally inherent towel characteristic that causes streaking if a regular towel is employed to wipe a polished surface, and to supply the towel with dirt retention characteristics and non-surface scratching characteristics.

It is another object of this invention to provide a process for forming a unique surface wiping towel, which, with only dampening, can be employed by automobile dealers to clean a vehicle in a matter of minutes without leaving dust or streaks on the vehicle. The inventor herein has, on the basis of a demonstration to automobile dealers encountered, sold thousands of the novel towels due to their unique characteristics. It should be noted that used car dealers as well as new car dealers have readily purchased these towels on the basis of a demonstration. This is not a fact to be lightly taken in view of the difficulty of convincing an automobile dealer of anything.

These and several other objects of this invention will be apparent upon studying the following specification.

The accompanying drawing is a flow sheet illustrating the method.

Basically, the novel treatment combines a process of removing undesired material from a conventional cotton base towel, substituting materials which achieve optimum wiping characteristics, and controlling the pore characteristics. The inventor herein discovered the fact that presently contained natural substances in the towel cause streaking and that other desirable materials to the towel can be substituted effectively only after the removal of these materials in a unique way, by diligent, extended efforts and experimentation.

The multi-step process involves several particular steps. Firstly, however, the process is employed on a cotton base towel, i.e. one having at least 50% cotton in it. A typical towel is generally 76% cotton and 24% rayon. This towel should contain open loops having the legs of the loops stitched to the base sheet of the towel, and extending generally uniformly therefrom. Thousands of these loops are positioned adjacent each other across the towel, and on both sides of the base sheet. The base sheet itself is substantially porous, being formed of a woven material and, after being treated, including pores of a size sufficient to receive dirt particles, dust particles and the like and retain them in the sheet out of contact with the surface wiped. When the towel is first purchased, the woven material is tightly formed so as to have little porosity for receiving dirt particles. When held up to a light, for example, light cannot be readily seen through the woven sheet.

It has been found that the natural oils and other foreign substances contained in the cotton base towel prevent non-smearing wiping of a polished surface. It has also been found that these oils and substances can be removed by specific steps as follows. First, the towel is placed in cold water, between about 40° and 50° F., and soaked for several hours, preferably about 8–12 hours. This cold water contains a conventional water soluble detergent cleansing material. The specific amount of detergent contained in the water is not critical, although the greater the detergent concentration, the faster the solubilizing action that occurs on the natural oils. The typical detergent concentration is, for example, about one pound per five gallons of water. The particular temperature of the water is also not critical, although the water should definitely be substantially below room temperature. The cold temperature of the water causes the towel fibers to contract or shrink somewhat, along with the solubilizing action of the detergent on the oils and other substances present in the material. This has been found to be advantageous. It should be noted that the inventor herein does not claim to understand all of the scientific principles involved behind this process, but has found that these specific steps and features do produce the final result desired.

After the towel is soaked in the detergent to solubilize the substances, the towel is agitated, for example, in a conventional washing machine, for several minutes, usually approximately ⅓ of an hour, to loosen all of the solubilized oil from the towel and disperse it throughout the water. This dissipates the materials quite thoroughly.

The towel is then run through a wringer into cold water, for example, about 40° to 65° F. The wringer action forces the water through the pores between the woven fibers of the base sheet of the towel to open up, and slightly enlarge these pores, and simultaneously clean the natural oils and detergent out of the pores. The cold water into which the towel is run for a rinse also includes detergent to provide a cleaning and dilution action on the wash water. Usually, it is preferable to wring the towel out of the first cold dilution bath and pass it into a second like cold rinse-dilution bath to thoroughly eliminate the detergent water containing the oil. The dilution is sufficient to lessen the oils, etc., to an insignificant amount. These second and third squeezing steps or wringing steps also cause the cold water to be flushed back and forth through the pores of the base sheet and to clean out these pores while substantially enlarging them so that if held up to a light, light can be seen through the pores. The pores are large enough to receive and retain dirt particles.

The cleaned towel is then placed in boiling water that contains a wax in emulsion. This wax may be of any of several suitable polishing waxes normally used for furniture or vehicle polishing. The wax may, for example, have a carnauba wax base or any other equivalent base, synthetic or natural. The amount of wax is not critical except that the wax should be in substantial quantity to cause thorough saturation of the towel. A typical wax emulsion would include about one pound of wax per five gallons of hot water. The towel is immersed in this boiling water for several minutes, usually about ⅓ of an hour, to assure thorough saturation of the fibers in the towel with the wax emulsion. The specific time will of course vary somewhat with the towel thickness and the wax concentration.

The towel is then wrung while still boiling hot to cause the wax particles to penetrate to all portions of the fibers, including the base sheet material. The wax, however, does not fill the pores between the fibers of the towel, but moves into the fibers.

The towel is then steamed by supporting it above a steam bath, for several minutes, usually about 5–15 minutes, depending on the thickness of the towel, etc. This steam is preferably formed in the boiling water-wax emulsion but is not necessarily so. The steam passes through the body sheet and visibly expands the pores between the crossed woven fibers of the base sheet to enable them to receive and retain dirt particles.

The towel is then placed in cold water that contains wax in emulsion. The cold water is room temperature or below, i.e. below about 75°. It has been found that if the towel is used after removing it from the hot wax-water emulsion, the boiling process causes the wax to later harden enough after it is cool and dry to be slightly stiff and greasy. Consequently, if utilized in this fashion, the loops on the towel are too stiff. Yet, the body sheet of the towel should be completely and thoroughly saturated with the wax from the boiling water since it is not possible to saturate the body of the towel with wax contained in cold water emulsion.

To achieve the optimum results, therefore, it has been found that the wrung out towel from the boiling water containing the wax emulsion should be immersed in cold water (equal to or less than room temperature) but containing wax of a lesser amount than the hot water. The emulsion of wax in the cold water is less concentrated than the emulsion in the hot water due to the physical laws involved. As an example, the wax in the cold water will be ⅓ or less of the concentration of that in the hot water. The time of immersion is at least several minutes, usually around 10–20 minutes. This causes two important effects. Firstly, it substantially lessens the amount of wax in the loops of the towel. This is due to the penetration of the cold water emulsion into the loose flexible loops protruding from the base sheet of the towel to substitute the wax in the cold water for the hot emulsion wax previously in the loops. It also results in a wax concentration in the loops substantially less than that originally in the loops and still in the towel body. The loops are then flexible over their length and not stiff as they otherwise would be. There must be some wax in the cold water, since mere cold water would remove the wax from the loops, rather than leaving the cold emulsion wax in them. This is, therefore, a substitution of cold emulsion wax and a dilution process to cause wax retention in the loops, but also leaving them in a flexible condition.

The treated towel is then passed through a wringer several times, usually three times, to remove all of the excess water. The towel is then molded to the proper configuration, i.e. formed on a support so that the towel is flat and substantially rectangular and the loops protrude at an acute angle generally in one direction away from the towel. The towel is then placed out to dry by evaporation with air passage, to remove the remainder of the water on the material fibers. Drying usually takes several hours using natural convection currents, with 10–12 being common. The finished towel is then ready for use.

As stated above, it has been found that if the towel is merely dampened, it is successful in removing dirt and dust from a polished surface without scratching the surface and without leaving streaks. The dirt is picked up by the loops and passed to the open pores of the base sheet which are large enough to receive the dirt and small enough to retain the dirt particles during the remainder of the sweep across the surface. The towel can be rinsed in cold water any number of times without upsetting the wax condition significantly to affect the towel's cleaning characteristics. If the towel becomes oily, it may be rinsed out in soapy water. Ordinarily, the towel does not become dirty readily, since the wax prevents the dirt from penetrating into and between the tiny fibers. The dirt is retained in a separated condition as a foreign body, readily washed out. It has been found that if any of the steps previously described are departed from substantially, the resulting product does not have the advantages of the product just described. However, certain minor variations can be made within the scope of the process steps as set forth above, and within the scope of the appended claims.

I claim:

1. A method of treating a cotton base towel containing natural oils to provide a surface cleaning cloth, comprising the steps of: providing a cotton base towel containing a woven sheet and a plurality of elongated loops attached to said sheet; soaking the towel in a cold detergent water bath to loosen and solubilize the natural oils in the towel fibers; agitating the towel in said bath to remove said solubilized oils from the towel; wringing the towel to force the water through pores between the woven strands in the base sheet to clear the pores, and to drain the detergent water and solubilized oils from the towel; rinsing the towel in cold detergent water; immersing the towel in boiling water containing a polishing wax in emulsion to soak the towel with wax; wringing the towel to penetrate the towel fibers completely with wax; steaming the towel to expand the pores of the base sheet; immersing the towel in cold water containing a wax emulsion for a several minute time period sufficient to remove the hot emulsion wax from the loops of the towel and substitute the cold emulsion wax, but short of a time period causing elimination of the hot emulsion wax from the towel body; wringing the excess of water from the towel; and drying the towel.

2. A method of treating a cotton base towel containing natural oils to provide a surface cleaning cloth comprising the steps of: providing a towel having a woven strand base and a plurality of extending loops; soaking and agitating the towel in a water-detergent bath; wringing the towel to drain the excess water from it and to force water through the pores between the woven strands rinsing the towel in a cold water bath; immersing the towel in a boiling water-wax emulsion; wringing the boiling water from the towel; steaming the towel; immersing the towel in a cold water-wax emulsion for a several minute time period sufficient to remove the majority of hot emulsion wax from the loops of the towel and substitute the cold emulsion wax, but short of a time period causing elimination of the hot emulsion wax from the towel body; wringing the towel; and drying the towel.

3. A method of treating a cotton base towel having natural oils to provide a surface cleaning cloth, comprising the steps of: providing a cotton base towel containing a woven sheet and a plurality of elongated loops attached to the sheet; soaking the towel in a cold detergent water bath at a temperature of approximately 40°–60° F. for several hours to loosen and solubilize the natural oils in the towel fibers and to shrink the towel; agitating the towel in said bath for several minutes to remove the solubilized oils from the towel; wringing the towel to force the water through pores between the woven strands in the base sheet to open said pores, and to drain said detergent water and solubilized oils from the towel; rinsing the towel through at least two cold water-detergent baths at temperatures substantially below normal room temperature, and wringing the towel after each rinsing step; immersing the towel for several minutes in boiling water containing a polishing wax in emulsion to soak the towel with wax; wringing said towel to penetrate the towel fibers completely with wax; passing steam through the towel to expand the pores of the base sheet to a size to receive dirt particles; immersing the towel in cold water containing a wax emulsion of less concentration than said boiling water, for a several minute time period sufficient to remove the majority of hot emulsion wax from the loops of the towel and substitute the wax from the cold bath but short of a time period causing elimination of the hot emulsion bath from the towel body; wringing the excess of water from the towel; and drying the towel by evaporation.

References Cited by the Examiner

UNITED STATES PATENTS

| | | | |
|---|---|---|---|
| 2,071,365 | 2/1937 | Stroop | 117—143 XR |
| 2,110,000 | 3/1938 | Kingman | 15—506 |
| 2,110,001 | 3/1938 | Kingman | 15—506 |
| 3,126,572 | 3/1964 | Franey | 15—506 |

WILLIAM D. MARTIN, *Primary Examiner.*

MURRAY KATZ, *Examiner.*